(12) United States Patent
Haraguchi et al.

(10) Patent No.: US 6,280,130 B1
(45) Date of Patent: Aug. 28, 2001

(54) FLOOR MAT RETAINER

(75) Inventors: Hirotaka Haraguchi, Niiza; Tomio Shibuya, Utsunomiya, both of (JP)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 09/554,391

(22) PCT Filed: Sep. 7, 2000

(86) PCT No.: PCT/JP99/05057

§ 371 Date: Aug. 1, 2000

§ 102(e) Date: Aug. 1, 2000

(87) PCT Pub. No.: WO00/17006

PCT Pub. Date: Mar. 30, 2000

(30) Foreign Application Priority Data

Sep. 18, 1998 (JP) .................................................. 10-265509

(51) Int. Cl.⁷ ..................................................... F16B 21/00
(52) U.S. Cl. ............................... 411/340; 24/297; 411/508
(58) Field of Search .................................. 411/340, 344, 411/345, 346, 508; 24/291, 297, 351

(56) References Cited

U.S. PATENT DOCUMENTS

| | | | |
|---|---|---|---|
| 726,636 | * | 4/1903 | Carll . |
| 4,112,815 | * | 9/1978 | Tanaka . |
| 4,850,773 | * | 7/1989 | Asami . |
| 5,228,816 | * | 7/1993 | Boville . |
| 5,775,859 | * | 7/1998 | Anscher . |

* cited by examiner

Primary Examiner—Flemming Saether
(74) Attorney, Agent, or Firm—Edward D. Murphy

(57) ABSTRACT

A pin (11) is formed projecting upwardly integrally with a face side holder (10) and a slit (13) is formed at a side thereof. On a rear side of the face side holder (10), a stationary pinching portion (20) is provided substantially in parallel therewith and a movable pinching portion (23) and is provided substantially in parallel therewith through a hinge portion (22). Each pinching portion (20, 23) is arranged to have free ends (20a) and (23a) at each tip side and is possible to change from a state where they are mutually horizontal interposing the hinge portion (22) therebetween to a state where they open outwardly so as to separate the tip thereof. The movable pinching portion (23) is integrated with a pin fitting portion (27) which extends to an opposite direction to the pin (11). The pin fitting portion (27) fits into a slit (13) by bending at the hinge portion (22) and is engaged to be one body with the pin (11) by means of an engaging portion (28).

3 Claims, 7 Drawing Sheets

FLOOR MAT RETAINER

BACKGROUND OF THE INVENTION

The present invention relates to a construction of a fastener attached to a floor carpet that is spread beforehand on a floor of a car in order to fasten a floor mat.

Such a floor mat fastener is disclosed for example in Japanese Utility Model Publication (Kokoku) No. Hei 7-33737, comprising a resin-made face side holder attached on a floor carpet and a substantially loop-like portion provided integrally on a rear side (a face to be under side when the floor mat fastener is attached) thereof. When the fastener is attached, the loop like portion is elongated to enter into a hole of the floor carpet and then depressed on a floor face to be squashed so that the floor carpet is pinched between the face side holder and the loop-like portion. In addition, an arrow shaped fitting projection is formed on an inside of a part to become an tip end when the loop like portion is elongated in an inserting direction and fitting recesses to fit thereto is provided on a rear side of the face side holder and inside the loop-like portion.

In said prior art, because the loop like portion is elongated in order to be inserted into a attaching hole while the fastener is attached, the floor carpet have to be widely turned over as much to kept apart from the floor face. However, it is hard as a practical matter to turn over the floor carpet like this. Even if it can be done, as the carpet must be flattened again and, also, a lot of time is needed for attaching the fastener. A purpose of the present invention is solving such a problem and providing a more easily attachable fastener.

SUMMARY OF THE INVENTION

In order to solve the above subject, the first feature of the present invention relates to a floor mat fastener which is attached to a floor carpet for fastening a floor mat comprising a pin for engaging the floor mat; a face side holder being set on a surface of the floor carpet; a rear side holder burrowing into a rear side of the floor carpet; the fastener being constructed to pinch the floor carpet between the face side holder and the rear side holder; wherein the rear side holder has a free end and at least a part of the rear side holder being made to be a movable pinching portion connected to the face side holder at an opposite end to the free end so as to be freely bent, a knob portion used while bending the movable pinching portion so that the movable pinching portion can freely engage or disengage the face side holder.

A second feature of the present invention relates to the floor mat fastener according to the above first feature, wherein a slit is formed on the pin in a longitudinal direction, a pin fitting portion is provided so as to freely fit to the slit, and to have the knob portion control the movements of the floor mat fastener.

The third feature of the present invention relates to the floor mat fastener according to the above second feature, wherein when the knob portion is risen the movable pinching portion comes to an attaching condition where it is parallel to a rear face of the face side holder and when the knob portion is tilted on the face side holder portion the movable pinching portion comes to an inserting condition to enter into an attaching hole where it rises in a substantially intersecting direction at a right angle to the face side holder, and a stationary pinching portion, which extends in an opposite direction to the movable pinching portion when the fastener is attached to the floor carpet, is formed integrally on the rear face of the face side holder.

According to the first feature, an end of a rear side holder is made to be a free end and a part thereof to be a movable pinching portion connected to a face side holder at an opposite end thereof so as to be freely bent. Moreover the movable pinching portion is made to rotate by means of a knob portion extending to a surface of the face side holder. Therefore, when the fastener is attached, the movable pinching portion can be made to be in an inserting condition to enter the free end thereof into an attaching hole which is provided on the floor carpet by tilting the knob portion on the face side holding portion. Thereafter, when the knob portion is risen up, it is made possible that the movable holding portion enters into the rear side of the floor carpet to rotate toward the face side holding portion and pinches the floor carpet between the face side holding portion and the movable pinching portion. When the knob portion is engaged to the face side holding portion, the fastener can be fixed on the floor carpet.

Since the rear side holder has the free end, by entering the free end into the attaching hole of the floor carpet, the movable holding portion can be inserted without undue raising or upsetting of the floor carpet. Thus, the fastener of the present invention is attached to the floor carpet.

Furthermore, since the knob portion is provided, rotating of the movable holding portion is possible from the surface side of the face side holder. Moreover by engaging the knob portion on the face side holding portion, the rotation of the movable holding portion can be maintained completing the attachment of the fastener to the floor carpet.

According to the second feature noted above, since a slit is formed on the pin in a longitudinal direction and a pin fitting portion is provided on the movable pinching portion which freely fits the slit, the appearance of the fastener can be improved by the integral knob portion being disposed above the slit of the pin. Furthermore, by being able to easily and speedily grasp the fastener during it being attached to the floor carpet, the attaching operation is improved as to workability and reliability.

According to the third feature noted above, a stationary pinching portion, which extends in an opposite direction to the rear side holder when the fastener is attached to the floor carpet, is formed integrally on the rear face of the face side holder at a predetermined distance. Whereby in a condition that the movable pinching portion and the stationary pinching portion approach mutually and the pin is tilted down, when free ends of both pinching portions are entered into the attaching hole of the floor carpet and then the knob portion and the pin are risen, each pinching portion is tilted down in an opposite direction on the rear side of the face side holder and the floor carpet can be pinched between the face side holder portion and themselves. Therefore, the fastener is strongly attached to the floor carpet and the pin with an integral knob portion serves as a stationary holding portion.

A floor mat fastener according to the present invention is useful when a floor mat is added to the floor carpet, that is formed in a separate body from the floor mat and is disposed on the floor of the automobile in a predetermined location and, in that location, is fastened to the floor carpet.

BRIEF DESCRIPTION OF THE ACCOMPANYING DRAWINGS

Figure 1:
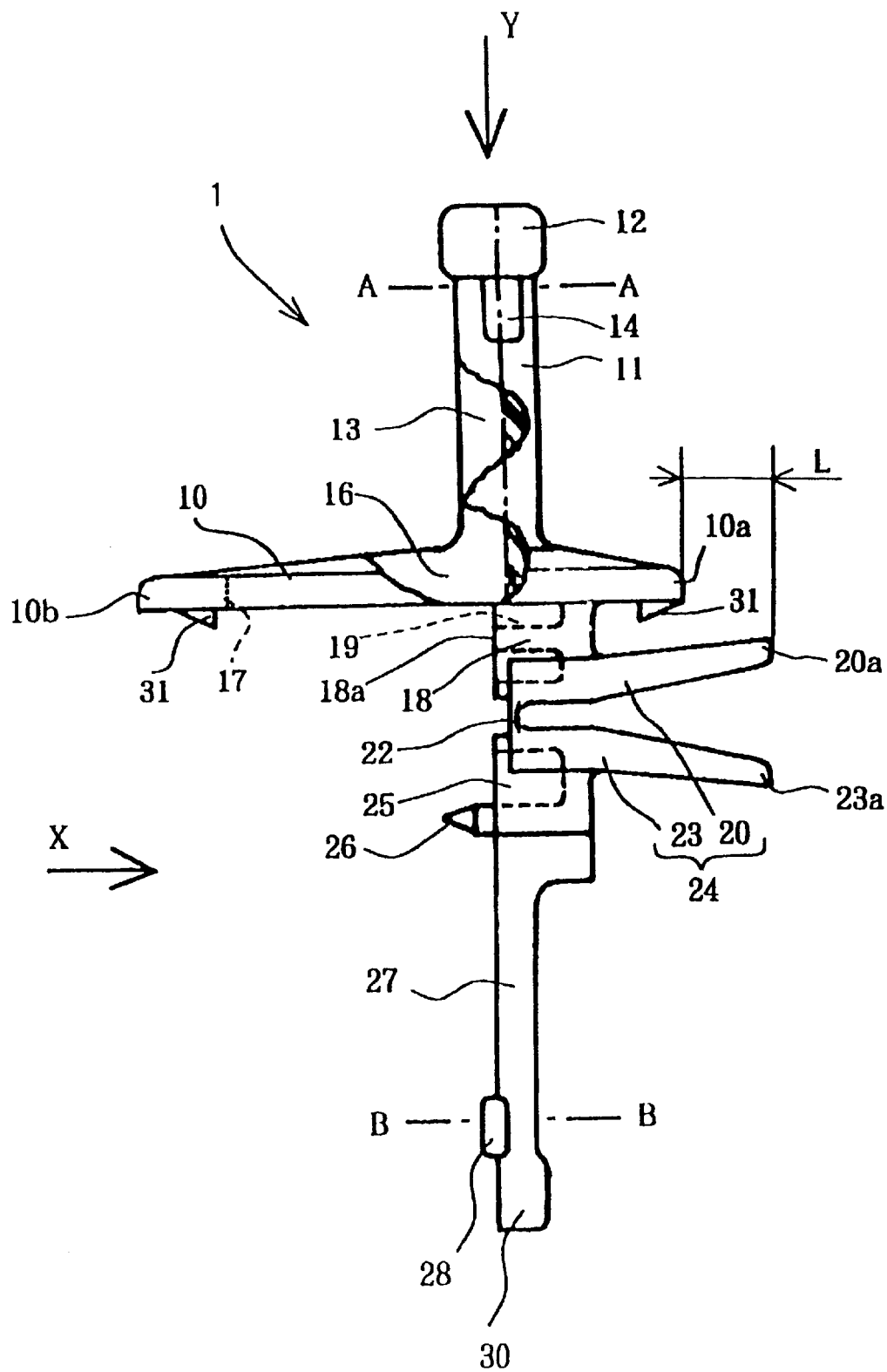
FIG. 1 is a side elevational view of the floor mat fastner of the present invention.
Figure 2:
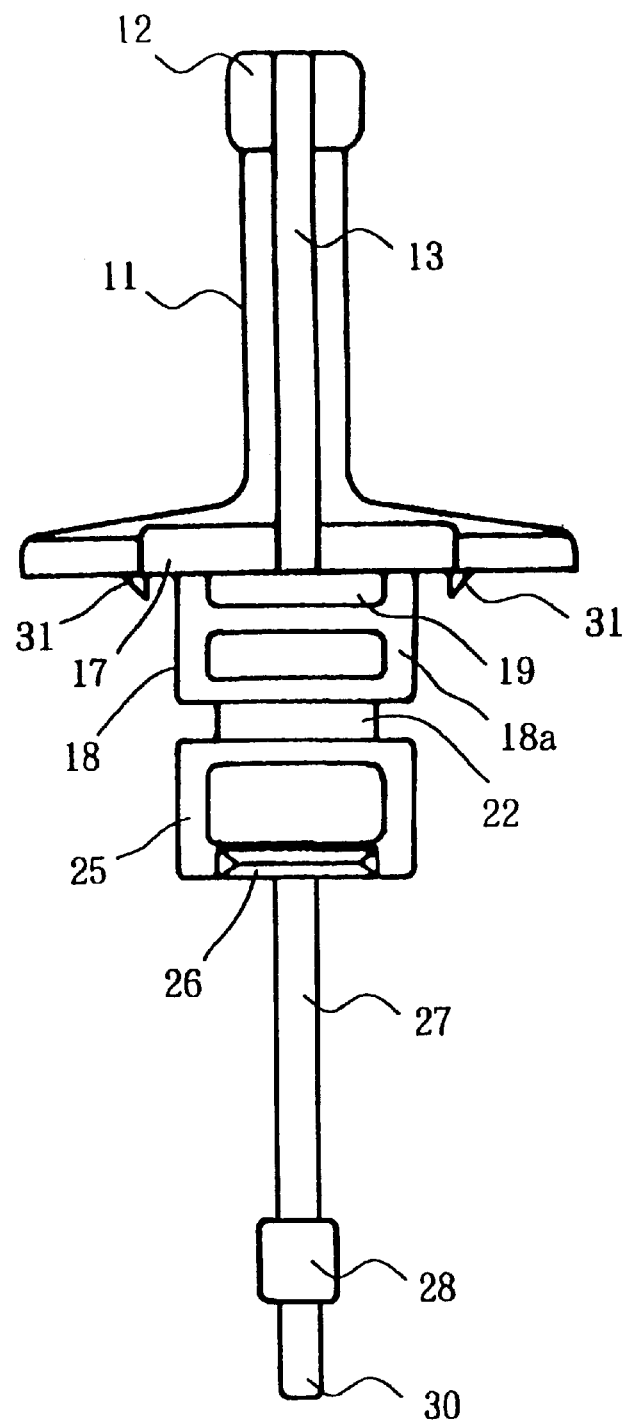
FIG. 2 is a view looking in the direction of the X arrow of FIG. 1.
Figure 3:
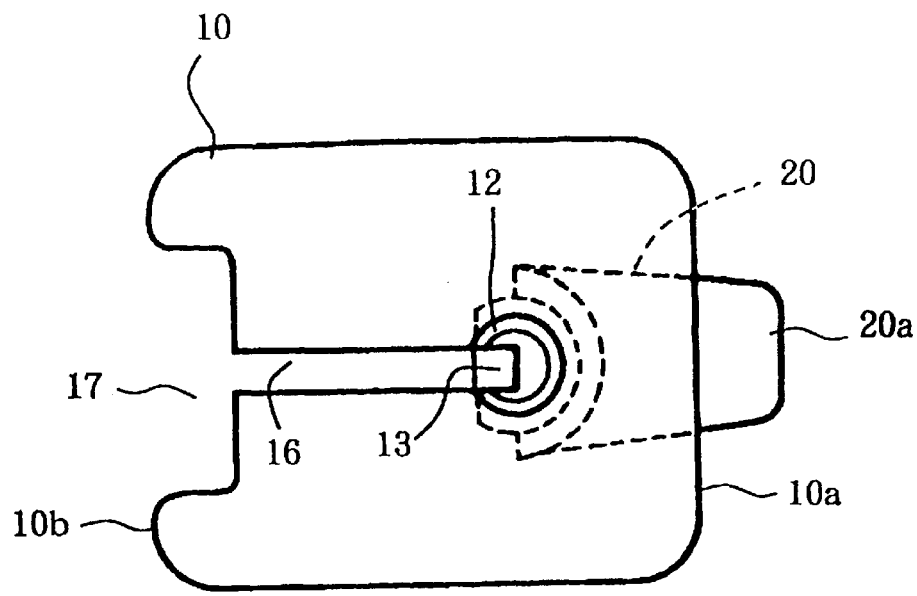
FIG. 3 is a top plan view of the present invention (looking in the direction of the Y arrow of FIG. 1)
Figure 4:
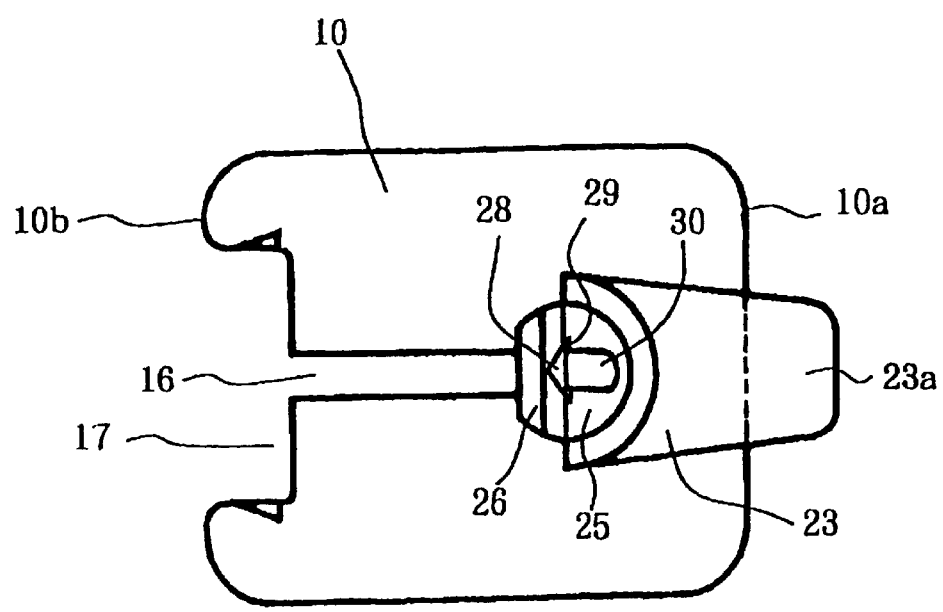
FIG. 4 is a bottom plan view of the present invention.
Figure 5:
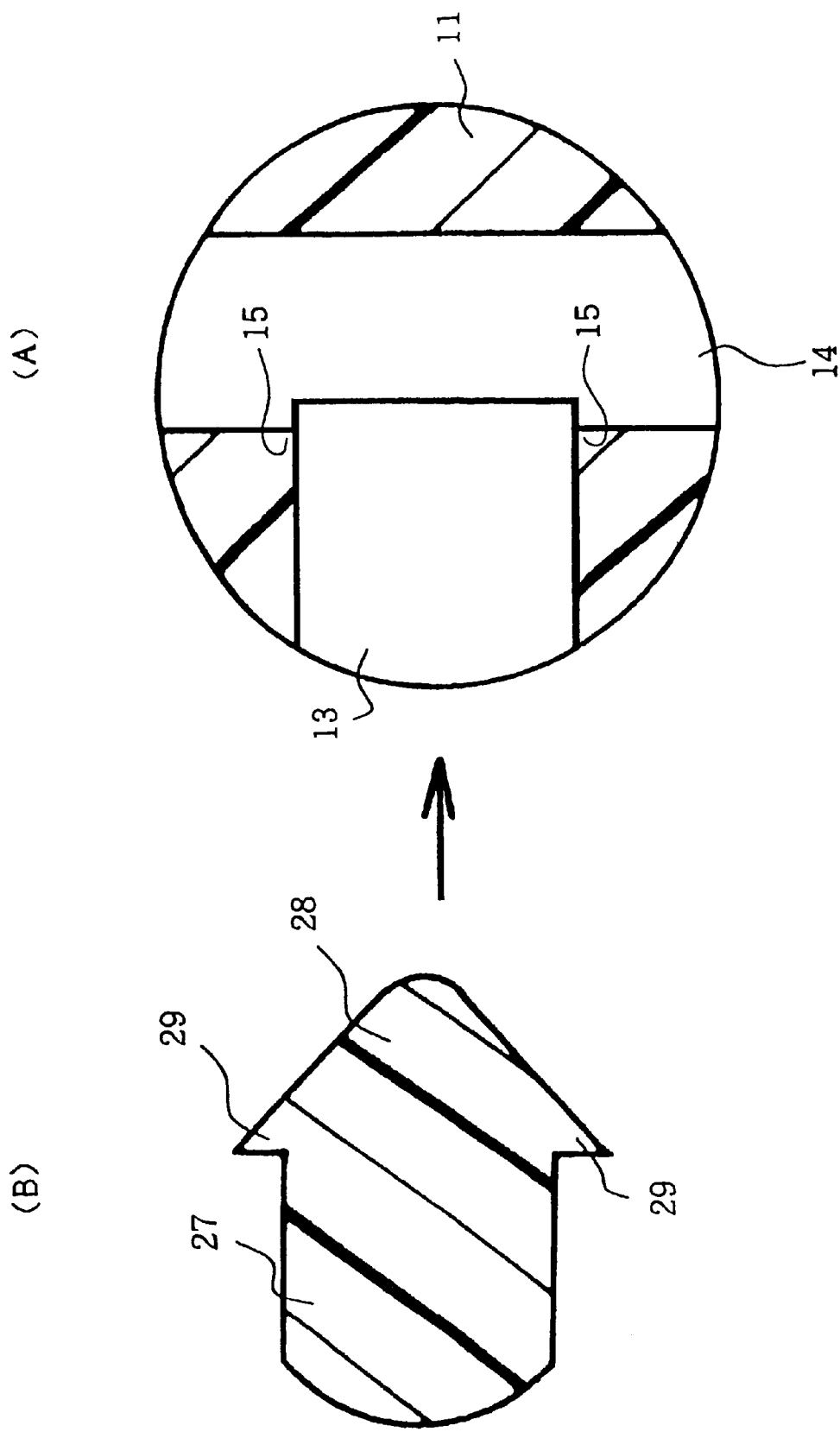
Figure 6:
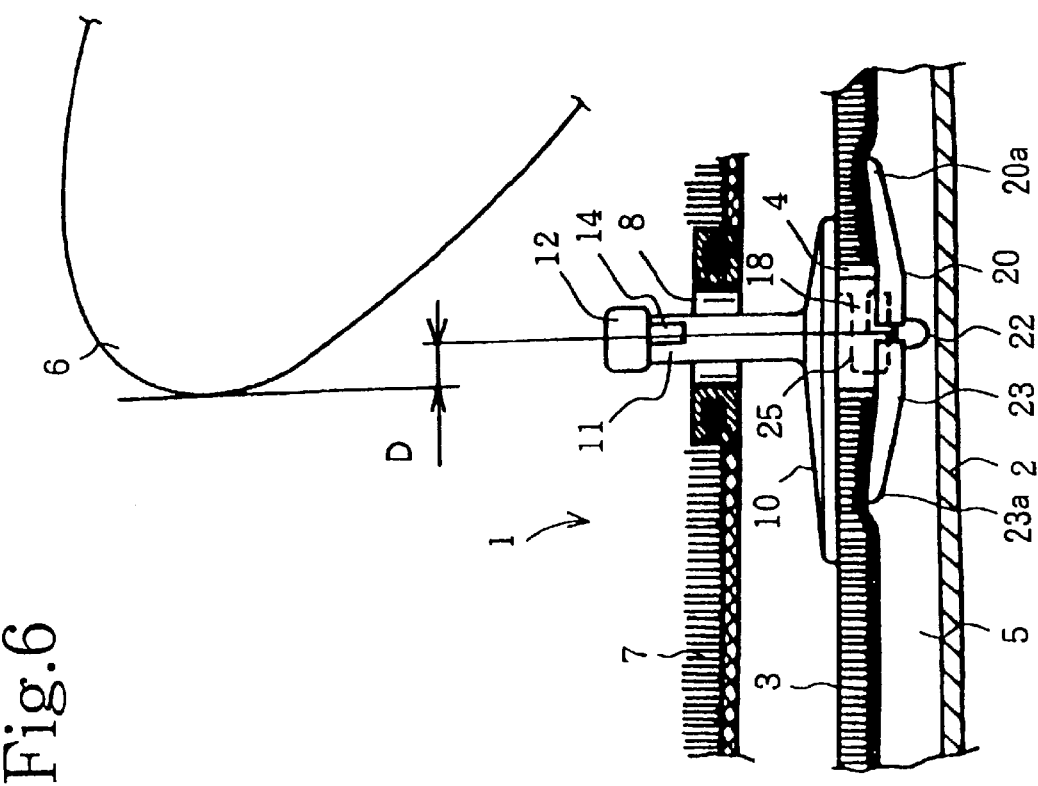

FIG. 5 combines the view taken along lines A—A and lines B—B of FIG. 1 showing the direction which the pin fitting portion (27) will take to be connected to the pin (11);

FIG. 6 is a side elevational view of the floor mat fastener of the present invention with the floor mat attached thereto; and FIGS. 7 through 11 are views showing various steps of attaching the floor mat fastener of the present invention to the floor carpet.

DETAILED DESCRIPTION OF THE PREFERRED EMBODIMENT

As best seen in FIG. 6, the fastener 1 is attached utilizing an attaching hole 4 which is formed on a floor carpet 3 spread on a floor face 2 of an automobile. The floor face 2 of a portion on which the fastener 1 is attached is made to be a recess and some gap 5 is formed between the floor face 2 and the floor carpet 3. The attached position of the fastener 1 is under an overhanging part of a seat 6 and it is desirable that the position is set inwardly by an adequate range D so as not to be touching the foot of anyone in the automobile.

The fastener 1 is a member for fixing a floor mat 7 on the floor carpet 3. On an end part of the floor mat 7 an eyelet-like mat ring 8 is provided which engages to freely install or uninstall to a pin or shank 11 (mentioned hereinafter) of fastener 1.

Various known materials can be used for the floor carpet 3 and the floor mat 7. For example, in the present instance, conventional needle punched-like material is used for the floor carpet 3 and napped filaments-like material is used for the floor mat 7.

Turning now to FIGS. 1 through 5, the fastener will be shown and described. The fastener 1 comprises a face side holder 10 which is substantially quadrilateral in a plan view and will be attached on a surface of the floor carpet 3, the pin 11 formed integrally therewith projecting upward and has a larger diameter knob portion 12 formed on the upper end (tip) of the pin 11. On a side of the pin 11 below the knob portion 12, is a slit 13 that extends in a longitudinal axial direction and on a base portion of the larger diameter portion 12, a through hole 14 is formed in a lateral direction.

FIG. 5 (A) corresponds to a section taken on A—A line in FIG. 1. As is apparent from this drawing, the slit 13 intersects the through hole 14 so that a tip thereof enters into the through hole 14 and an engaging corner portion 15 is formed at a portion where the slit 13 intersects the through hole 14.

The pin 11 of the face side holder 10 is formed at a one-sided position from the center toward an end 10a side in the longitudinal direction. Between another end 10b thereof and the pin 11, a face side holder slit 16 having a same width as the slit 13 is formed so as to run from the other end 10b to the slit 13. The face side holder slit 16 runs to a wider cut out portion 17 formed at the other end 10b side. The face side holder slit 16 runs to a wider cut out portion 17 that is formed at the other end 10b.

At a neighboring portion of the pin 11 on a rear face of the face side holder 10 (a face contacting to the carpet 3), a stationary side boss 18 is formed integrally therewith. A fitting recess 19 is formed at this position and an end of the boss is opened to a side face 18a that is provided on an extended line from the slit 13.

Projecting from the stationary side boss 18 toward the end 10a, a stationary pinching portion 20 is formed integrally with the face side holder 10 in parallel thereto. An end of the stationary pinching portion 20 is a free end 20a and inclines somewhat toward the face side holder 10.

An end of the stationary side boss 18 of the stationary pinching portion 20 communicates with an end of a movable pinching portion 23 through a thin hinge portion 22. An opposite end of the movable pinching portion 23 is also a free end 23a and slants to an opposite side of the free end 20a of the stationary pinching portion 20. The stationary pinching portion 20 and the movable pinching portion 23 are formed to be somewhat outwardly open.

The free end 20a of the stationary pinching portion 20 and the free end 23a of movable pinching portion 23 project respectively longer than the end portion 10a on which the stationary side boss 18 is formed by a space L (see FIG. 1). L is arranged to be somewhat longer than thickness of the floor carpet 3. The stationary pinching portion 20 and the movable pinching portion 23 are parts of a rear side holder 24.

A movable side boss 25 corresponding to the stationary side boss 18 is provided on the movable pinching portion 23 and a projection 26, which projects from the movable side boss 25 to an opposite side of the movable pinching portion 23 and can fit to the fitting recess 19, is integrally formed with the boss 25. A pin fitting portion 27 is integrally formed extending in an opposite direction of the pin 11.

While fitting to the slit 13, the pin fitting portion 27 has a size and a shape so as to show an appearance of the pin 11 as a column. Near a tip thereof an engaging portion 28 is integrally formed and at the tip thereof an enlarged portion 30 is formed that will be connected into the knob portion 12.

FIG. 5(B) corresponds to a sectional view taken on line B—B of FIG. 1. As is apparent from this drawing, the engaging portion 28 is formed to be a general arrow shape having a claw portion 29. When the pin fitting portion 27 fits into the slit 13, the engaging portion 28 enters into the slit 13 with the claw portion elastically deforming and engages with the engaging corner portion 15 within the pin 11.

When the pin fitting portion 27 fits with the slit 13, the enlarged portion 30 is also integrated with the larger diameter portion 12 to have a size and a shape for showing an appearance as one larger diameter portion. The larger diameter portion 12 is formed to stop accidental removal of the floor mat 7.

The movable side boss 25 has a size and a shape for fitting into the cut out portion 17 of the face side holder 10 when the fastener is attached. On a rear end of the face side holder 10 an engaging projection 31 project in order to bite the floor carpet 3.

The whole fastener 1 is integrally formed of a suitable resin such as polypropylene to gain resin hinge effect at the hinge portion 22.

Figure 7:
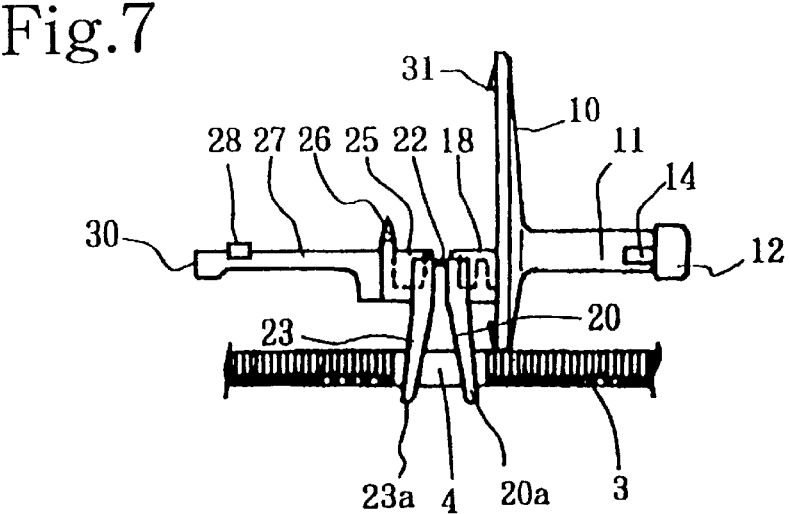

As is shown in FIG. 7, the fastener 1 is set on or adjacent the floor carpet 3 and the free ends 20a and 23a thereof are inserted into the fastening hole 4. Since the free ends 20a and 23a project from the end of the face side holder 10 by a size L (see FIG. 1), the end 10a of the face side holder 10 touches on the surface of the floor carpet 3 near the fastening hole 4 and the free ends 20a and 23a come out downward the floor carpet 3 through the fastening hole 4.

Figure 8:
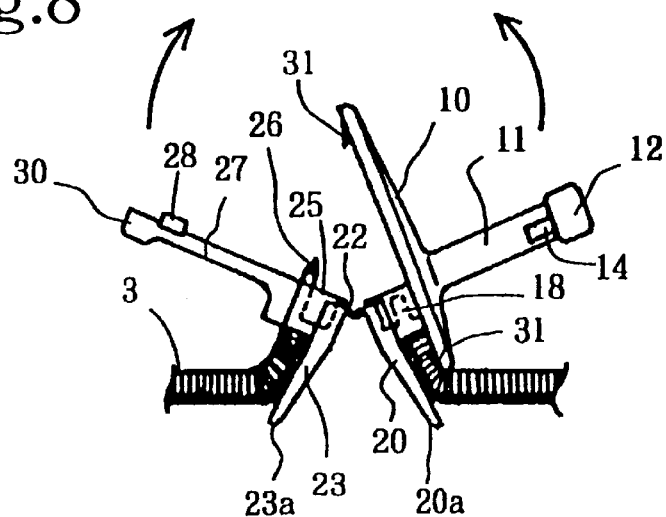
Figure 9:
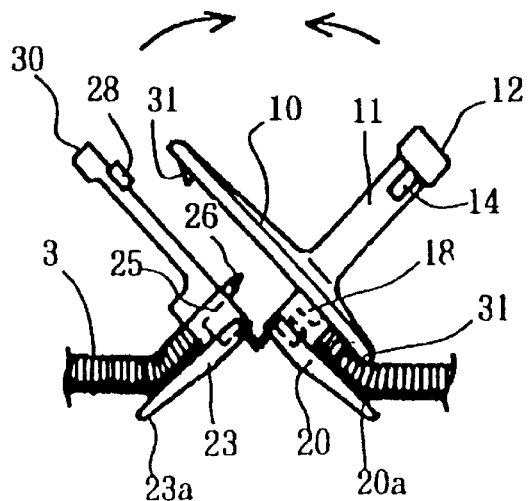

When the pin 11 and the pin fitting portion 27 are raised in the direction of the arrows and towards each other, as is shown in FIGS. 8 and 9, the free ends 20a and 23a gradually enter into the fastening hole 4. During the free ends 20a and 23a entering into the hole 4, as a gap between them opens outwardly, the stationary pinching portion 20 and the movable pinching portion 23 enter further into the fastening hole 4. A surrounding part of the fastening hole 4 of the floor carpet 3 is interposed between the face side holder 10 and the stationary pinching portion 20. At the time, the surrounding part of the fastening hole 4 of the floor carpet 3 is remote from the engaging projection 31.

Figure 10:
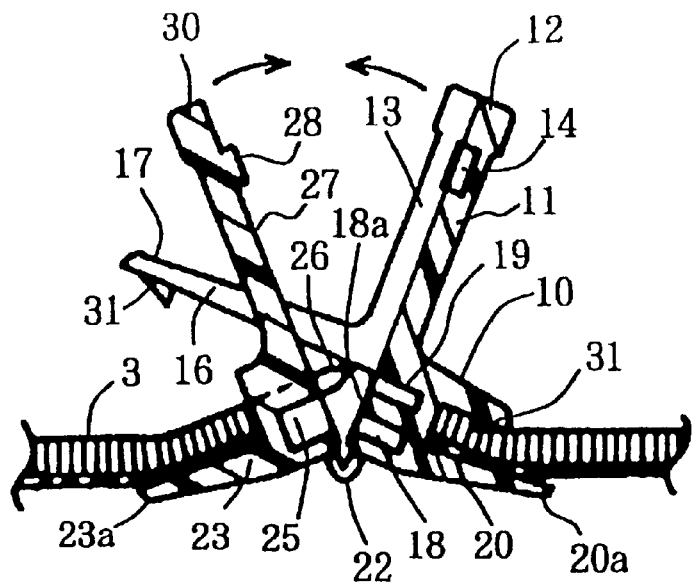
Figure 11:
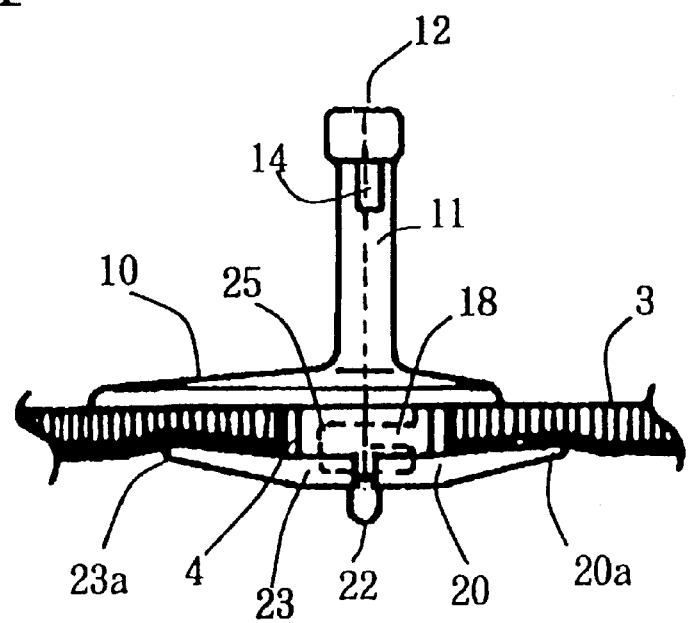

As shown in FIG. 10 (only this FIG. is especially drawn as a section in FIGS. 7–11), when the pin fitting portion 27 enters into the face side holder slit 16 the pin fitting portion 27 and the face side holder fall into an intersecting state. After the fastener 1 continues to rise the pin fitting portion 27 fits to the slit 13 and the claw portion 29 of the engaging portion 28 engages with the engaging corner portion 15 in the slit 13. At the same time, the movable side boss 25 fits into the cut out portion 17 to contact to the stationary side boss 18 and the projection 26 fits into the fitting recess 19 to become an installation finishing state shown in FIG. 11.

At this time because each tip portion of the free end 20a and 23a are disposed to be outwardly open and slightly raised, they will act to compress and pinch the surrounding part of the fastening hole 4 of the floor carpet 3 against a rear side of the face side holder 10, and the fastener 1 is further held in assembled position by engaging projection 31.

Whereby, the fastener 1 is securely fixed to the floor carpet 3 and remains so because of the pinching action of the stationary pinching portion 20 and the movable pinching portion 23. Additionally, since the free ends 20a and 23a are opened outwardly (in a direction approaching to the face side holding portion 10) after initially entering into the fastening hole 4, it is possible to minimize an amount of the fastener 1 that is inserted into the fastening hole 4.

Furthermore, the rising action of the pin 11 and the pin fitting portion 27 cause the portions 20 and 23 to pinch the area surrounding the fastening hole 4. Therefore, the fastener 1 is attached to the floor carpet 3 with minimum displacement of the floor carpet 3. Also, as the fastening hole 4 is relatively small, it can be randomly located in any one of a variety of locations.

Further, since the pin 11 and the pin fitting portion 27 when joined, combine to form the knob portion 12. Also, as the engaging portion 28 is arranged to engage with the pin 11, the through hole 14 can be optionally set in the longitudinal axial direction of the pin 11 and the freedom of providing the engaging portion is also increased.

In addition, because a fitting portion of the pin fitting portion 27 and the slit 13 is exposed on the surface side of the floor carpet 3, it is possible to check the fitting condition by eyesight. Accordingly, since it is possible at once to judge a fastening to see the quality of the fastener 1 whether or not the attached is finished or unfinished, its workability and reliability are also increased. Moreover, since the pin fitting portion 27 is fitted to the slit 13 of the pin 11, the appearance of the pin 11 and the fastener 1 is improved.

It will be understood that the present application is not limited to the embodiment described above and may be varied in many ways For example, the engaging portion of the pin fitting portion 27 can be provided not only on the pin 11 but on the face side holder portion 10 or on the stationary side boss 18 and the like.

In addition, it is unnecessary to use the stationary pinching portion 20 integrally and fixedly with the face side holder 10 and it is possible to provide the stationary pinching portion 20 and the movable pinching portion 23 so as to rise respectively against the face side holder 10. In this case, since the pin 11 can not be utilized as the knob portion of the stationary pinching portion 20, the knob may be provided on the face side holder 10 in a different body from the pin 11.

It is also possible to attach the movable pinching portion 23 on the rear face of the face side holder 10 through the hinge portion 22 while eliminating the stationary pinching portion 20 and to pinch the floor carpet 3 by merely the movable pinching portion 23 and the face side holder 10.

Also, the pin fitting portion 27 is not necessarily required to combine with the pin 11 and may be provided on the face side holder 10 as a different body from the pin 11.

In general, the above-identified embodiments are not to be construed as limiting the breadth of the present invention. It is understood that other modifications or other alternative constructions will be apparent which are within the scope of the invention as defined in the appended claims.

What is claimed is:

1. A fastener (1) which is attached to an attaching hole (4) in the floor carpet (3) and to which a floor mat (7) is connected by an attaching hole (8), the fastener (1) comprising:

a. a pin (11) having a longitudinal axial slot (13) therethrough disposed on one side of the fastener (1);

b. an upper holder (10) formed at the lower end of the pin (11) and to engage the floor carpet (3) on the under side thereof;

c. the upper holder (10) is slotted coincidentally to the pin slot (13);

d. a pair of lower holders (20, 23) formed in spaced relationship to the upper holder, adjacent the underside thereof;

e. the pair of lower holders hinge connected at one end (22) and free at the other end (20a, 23a) thereof;

f. a pin fitting portion (27) extending in a longitudinal axial direction away from the pin (11) and adopted to be shifted toward the pin (11) responsive to the insertion of the lower holders into the hole (4) and causing pivoting movement of the pin fitting portion (27) toward and in engagement with the pin (11) whereby, upon completion of insertion and shifting of the lower holders (20, 23), the upper holder (10) and the lower holders (20, 23) to attach the fastener (1) to the floor carpet (3) therebetween at the attaching hole (4);

g. the pin fitting portion (27) is sized to be disposed into the slot (13) of the pin (11) after passing through the slot of the upper holder; and h. a knob portion (12) is formed at the outer end of the pin (10) remove from the upper holder (10) and into which the upper end of the pin fitting portion (27) will be disposed.

2. The combination claimed in claim 1 wherein:

a. the fastener (1) is disposed on the upper side of the floor carpet (3) and only the pair of lower holders (20, 23) which enter the attaching hole (4) are engaged on the under side of the floor carpet (3).

3. The fastener (1) according to claim 2 wherein:

a. a slit (13) is formed on the pin (11) in a slit (13) is formed on the pin (11) in a longitudinal axial direction; and b. the pin fitting portion (27) freely fits into the slit (13) and is arranged to have its upper end an integral part of the knob portion (12) of the pin (11).

* * * * *

UNITED STATES PATENT AND TRADEMARK OFFICE
CERTIFICATE OF CORRECTION

PATENT NO.     : 6,280,130 B1
DATED          : August 28, 2001
INVENTOR(S)    : Hirotaka Haraguchi et al.

It is certified that error appears in the above-identified patent and that said Letters Patent is hereby corrected as shown below:

<u>Title page,</u>
Item [73], Assignee, "Emhart Inc., Newark, DE (US)" should be -- Emhart Inc., Newark, DE (US) and Kabushi Kaisha Honda Access, Saitama, Japan --.
Item [30], Foreign Application Priority Data, "10-265509" should be
-- 10-265505 --.

Signed and Sealed this

Eighteenth Day of February, 2003

JAMES E. ROGAN
*Director of the United States Patent and Trademark Office*